(12) United States Patent
Park et al.

(10) Patent No.: US 10,072,149 B2
(45) Date of Patent: Sep. 11, 2018

(54) MODIFIED POLY (ARYLENE ETHER) RESIN COMPOSITION, METHOD OF PREPARING THE SAME AND MOLDED ARTICLE PRODUCED THEREOF

(71) Applicant: LG CHEM, LTD., Seoul (KR)

(72) Inventors: Nam Jib Park, Daejeon (KR); Sang Ho Lee, Daejeon (KR); Se Yeong Ju, Daejeon (KR); Sung Ho Lee, Daejeon (KR); Sung Tae Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 4 days.

(21) Appl. No.: 15/111,746

(22) PCT Filed: Feb. 17, 2016

(86) PCT No.: PCT/KR2016/001602
§ 371 (c)(1),
(2) Date: Jul. 14, 2016

(87) PCT Pub. No.: WO2017/010647
PCT Pub. Date: Jan. 19, 2017

(65) Prior Publication Data
US 2017/0174884 A1    Jun. 22, 2017

(30) Foreign Application Priority Data

Jul. 14, 2015 (KR) .................. 10-2015-0099695
Feb. 2, 2016 (KR) .................. 10-2016-0012777

(51) Int. Cl.
C08L 71/12 (2006.01)
C08L 77/00 (2006.01)
C08L 77/06 (2006.01)

(52) U.S. Cl.
CPC .......... C08L 77/06 (2013.01); C08L 71/123 (2013.01); C08L 71/126 (2013.01); C08L 2205/035 (2013.01); C08L 2205/06 (2013.01); C08L 2207/53 (2013.01)

(58) Field of Classification Search
CPC .... C08L 77/06; C08L 2205/035; C08L 71/12; C08L 71/123; C08L 71/126; C08L 53/02; C08L 53/025; C08L 23/00
See application file for complete search history.

(56) References Cited

U.S. PATENT DOCUMENTS

| | | | | |
|---|---|---|---|---|
| 4,732,928 A * | 3/1988 | Mizushiro | ............... | C08L 53/02 524/423 |
| 4,760,114 A | 7/1988 | Haaf et al. | | |
| 4,888,397 A * | 12/1989 | van der Meer | .......... | C08K 5/00 525/132 |
| 5,019,626 A * | 5/1991 | Taubitz | .................... | C08L 71/12 525/133 |
| 5,247,017 A * | 9/1993 | Noma | ..................... | C08L 77/00 525/133 |
| 5,710,212 A * | 1/1998 | Asano | .................. | C08L 71/126 525/133 |
| 6,797,776 B1 * | 9/2004 | Suzuki | .................... | C08L 23/10 525/98 |
| 2002/0198321 A1* | 12/2002 | Nakamura | ........... | C08G 65/007 525/100 |
| 2009/0137716 A1* | 5/2009 | Furukawa | ............... | C08L 53/02 524/426 |
| 2013/0072885 A1* | 3/2013 | Luther | .................. | A61F 5/4404 604/333 |
| 2017/0198140 A1* | 7/2017 | Park | ........................ | C08L 77/06 |

FOREIGN PATENT DOCUMENTS

| | | |
|---|---|---|
| EP | 0751186 A2 | 1/1997 |
| EP | 2497801 A1 | 9/2012 |
| EP | 3112402 A1 | 1/2017 |
| EP | 3138877 A1 | 3/2017 |
| JP | 1993339496 | 12/1993 |
| JP | 1997012872 A | 1/1997 |
| JP | 2003-528941 A | 9/2003 |
| JP | 2007517917 A | 7/2007 |
| JP | 2010031199 A | 2/2010 |
| KR | 10-2007-0102750 A | 10/2007 |
| KR | 1020110048376 A | 5/2011 |
| KR | 1020130079535 A | 7/2013 |
| KR | 1020140086736 A | 7/2014 |
| KR | 1020140086737 A | 7/2014 |
| WO | 99/54404 A1 | 10/1999 |

* cited by examiner

*Primary Examiner* — Jeffrey C Mullis
(74) *Attorney, Agent, or Firm* — Dentons US LLP (57) ABSTRACT

Disclosed is a poly(arylene ether) resin composition, and more specifically, a modified poly(arylene ether) resin composition including a poly(arylene ether) resin, a poly(arylene ether) resin modified with unsaturated carboxylic acid or an anhydride thereof, a polyamide resin, a polyolefin resin, and an encapsulating agent, wherein the polyolefin resin is encapsulated by the encapsulating agent with the poly(arylene ether) resin and the poly(arylene ether) resin modified with unsaturated carboxylic acid or an anhydride thereof, and a molded article produced therefrom. The disclosed composition has an effect of providing a modified poly(arylene ether) resin composition which has less change in physical properties caused by moisture, and has low specific gravity and superior impact strength, weatherability and balance in physical properties.

18 Claims, 2 Drawing Sheets

MODIFIED POLY (ARYLENE ETHER) RESIN COMPOSITION, METHOD OF PREPARING THE SAME AND MOLDED ARTICLE PRODUCED THEREOF

TECHNICAL FIELD

This application is a National Stage Application of International Application No. PCT/KR2016/001602, filed Feb. 17, 2016, and claims the benefit of Korean Patent Application No. 10-2016-0012777, filed Feb. 2, 2016, and Korean Patent Application No. 10-2015-0099695, filed Jul. 14, 2015, the contents of which are incorporated herein.

The present invention relates to a modified poly(arylene ether) resin composition and, more specifically, relates to a modified poly(arylene ether) resin composition which has less change in physical properties caused by moisture, and has low specific gravity and superior impact strength, weatherability and balance in physical properties, a method of preparing the same and a molded article produced therefrom.

BACKGROUND ART

A poly(arylene ether) resin is a non-crystalline resin which is widely used in a variety of fields including vehicle components, electric and electronic product components and the like owing to dimensional stability, electrical insulation, heat resistance, rigidity and the like. However, as a poly(arylene ether) resin alone has no workability due to high melt viscosity or the like, the poly(arylene ether) resin is blended with a polymer such as polyamide, polyolefin or polystyrene in order to improve workability. In particular, it is known that a resin composition with improved heat resistance and workability can be obtained, when a poly(arylene ether) resin is blended with a polyamide resin, and a modified poly(arylene ether) resin, which is a poly(arylene ether)/polyamide blend resin, is used for components requiring high heat resistance. However, the modified poly(arylene ether) resin still has many problems such as deterioration in appearance, dimensional stability and impact strength, and change in physical properties caused by moisture due to blending of poly(arylene ether) with polyamide.

Accordingly, a great deal of research is underway in order to solve these problems, but the fundamental problems, i.e., high specific gravity of polyamide and great change in physical properties caused by moisture, of the poly(arylene ether)/polyamide blending resin, remain unsolved.

PRIOR ART DOCUMENT

Patent Document

Patent Document 1. U.S. Pat. No. 4,760,114 A

DISCLOSURE

Technical Problem

Therefore, the present invention has been made in view of the above problems, and it is one object of the present invention to provide a modified poly(arylene ether) resin composition which has less change in physical properties caused by moisture, and has low specific gravity and superior impact strength, weatherability and balance in physical properties.

It is another object of the present invention to provide a method of preparing the modified poly(arylene ether) resin composition.

It is another object of the present invention to provide a molded article produced from the modified poly(arylene ether) resin composition.

The above and other objects of the present invention can be accomplished by the present invention described below.

Technical Solution

In accordance with the present invention, the above and other objects can be accomplished by the provision of a modified poly(arylene ether) resin composition including a poly(arylene ether) resin, a poly(arylene ether) resin modified with unsaturated carboxylic acid or an anhydride thereof, a polyamide resin, a polyolefin resin and an encapsulating agent, wherein the polyolefin resin is encapsulated by the encapsulating agent with the poly(arylene ether) resin.

In accordance with another aspect of the present invention, provided is a method of preparing the modified poly(arylene ether) resin composition including simultaneously batch-feeding, into a main feeder of a kneader, a poly(arylene ether) resin, a poly(arylene ether) resin modified with unsaturated carboxylic acid or an anhydride thereof, a polyamide resin, a polyolefin resin and an encapsulating agent.

In accordance with another aspect of the present invention, provided is a molded article produced from the modified poly(arylene ether) resin composition.

Effects of the Invention

The present invention has an effect of providing a modified poly(arylene ether) resin composition which has less change in physical properties caused by moisture, and has low specific gravity and superior impact strength, weatherability and balance in physical properties.

In addition, the present invention has an effect of providing a method of preparing the modified poly(arylene ether) resin composition.

In addition, the present invention has an effect of providing a molded article produced from the modified poly(arylene ether) resin composition.

BEST MODE

Hereinafter, the present invention will be described in detail.

As a result of repeated research on a modified poly (arylene ether) resin composition comprising a blend of a poly(arylene ether) resin and a polyamide resin, the present inventors found that specific gravity of the resin composition can be decreased and change in physical properties caused by moisture can be reduced by introducing a poly(arylene ether) resin modified with unsaturated carboxylic acid or an anhydride thereof and a polyolefin resin into a conventional poly(arylene ether) resin and a conventional polyamide resin, and encapsulating the polyolefin resin with the poly (arylene ether) resin using an encapsulating agent. The present invention has been completed based on this finding.

The modified poly(arylene ether) resin composition according to the present invention comprises a poly(arylene ether) resin, a poly(arylene ether) resin modified with unsaturated carboxylic acid or an anhydride thereof, a polyamide resin, a polyolefin resin and an encapsulating agent, wherein the polyolefin resin is encapsulated by the encapsulating agent with the poly(arylene ether) resin and the poly(arylene ether) resin modified with unsaturated carboxylic acid or an anhydride thereof.

The modified poly(arylene ether) resin composition refers to a substance in which a poly(arylene ether) resin is blended with a polyamide resin such that the poly(arylene ether) resin is dispersed in the polyamide resin as a matrix resin and detailed explanation thereof will be given below.

For example, the modified poly(arylene ether) resin composition may include a) a domain resin including a core including the polyolefin resin, a capsule surrounding the core and containing the poly(arylene ether) resin and the poly(arylene ether) resin modified with unsaturated carboxylic acid or an anhydride thereof, and a membrane formed by the encapsulating agent between the core and the capsule; and b) a matrix resin including the polyamide resin.

The domain resin may be, for example, a resin which has a structure of the core-membrane-capsule dispersed in the matrix resin. In this case, this structure has advantages of superior impact strength and weatherability, and excellent balance in physical properties, as compared to a structure in which the resin and the copolymer are individually dispersed in the matrix resin.

The domain resin may, for example, have a spherical, ellipsoidal or cylindrical shape.

The core may be, for example, in 1 or more phases, 1 to 10 phases, 1 to 5 phases, or 1 to 3 phases within the membrane formed by the encapsulating agent between the core and the capsule. Within this range, there are effects of superior impact strength and weatherability.

The phase of the core means a phase in which all interfaces of the core contact an inner surface of the membrane formed by the encapsulating agent within the membrane formed by the encapsulating agent, or a phase which contacts an interface of the core forming another phase on the inner surface of the membrane formed by the encapsulating agent or within the membrane.

The poly(arylene ether) resin of the present invention is not particularly limited and is, for example, a homopolymer having a unit represented by the following Formula 1 or Formula 2, or a copolymer having a unit represented by the following Formula 1 or Formula 2:

[Formula 1]

[Formula 2]

wherein $R_a$, $R_1$, $R_2$, $R_3$ and $R_4$ are substituents of an arylene group (Ar) or a phenylene group which are each independently or simultaneously a hydrogen, chlorine, bromine, iodine, methyl, ethyl, propyl, allyl, phenyl, methylbenzyl, chloromethyl, bromomethyl, cyanoethyl, cyano, methoxy, phenoxy or nitro group, n an integer of 4 to 20, and Ar is a C7-C20 arylene group. For example, $R_1$ and $R_2$ are an alkyl group or a C1-C4 alkyl group, and $R_3$ and $R_4$ are hydrogen.

The poly(arylene ether) resin is, for example, a poly (phenylene ether)-based resin.

The poly(phenylene ether)-based resin means a poly (arylene ether) resin represented by the following Formula 3.

[Formula 3]

wherein W, X, Y and Z are hydrogen or a substituent and n is a repeat unit.

W, X, Y and Z are each independently or simultaneously a hydrogen, chlorine, bromine, iodine, methyl, ethyl, propyl, allyl, phenyl, methylbenzyl, chloromethyl, bromomethyl, cyanoethyl, cyano, methoxy, phenoxy or nitro group and n is an integer of 4 to 20.

The homopolymer of the poly(arylene ether) resin is not particularly limited and specific examples thereof include one or more selected from the group consisting of poly(2, 6-dimethyl-1,4-phenylene) ether, poly(2,6-diethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, poly(2,6-dimethoxy-1,4-phenylene) ether, poly(2,6-dichloromethyl-1,4-phenylene) ether, poly(2,6-dibromomethyl-1,4-phenylene) ether, poly (2,6-diphenyl-1,4-phenylene) ether and poly(2,5-dimethyl-1,4-phenylene) ether.

In addition, the copolymer of the poly(arylene ether) resin is not particularly limited and specific examples thereof include a copolymer of 2,6-dimethylphenol and 2,3,6-trimethylphenol, a copolymer of 2,6-dimethylphenol and o-cresol, a copolymer of 2,3,6-trimethylphenol and o-cresol and the like.

The poly(arylene ether) resin may be, for example, present in an amount of 10 to 40% by weight, 20 to 40% by weight, or 30 to 40% by weight, based on the total weight of the resin composition according to the present invention. Within this range, there are effects of superior compatibility with polyamide and impact strength. The poly(arylene ether) resin for example has a weight average molecular weight of 10,000 to 100,000 g/mol, or 10,000 to 70,000 g/mol, or 15,000 to 45,000 g/mol. Within this range, there are effects of superior processability and balance in physical properties. The weight average molecular weight may be measured by gel permeation chromatography.

The poly(arylene ether) resin modified with unsaturated carboxylic acid or an anhydride thereof of the present invention is not particularly limited so long as it is a poly(arylene ether) resin modified with unsaturated carboxylic acid or an anhydride thereof used as a resin for polymer blending.

The unsaturated carboxylic acid or an anhydride thereof may, for example, include one or more selected from the group consisting of acrylic acid, methacrylic acid, methyl methacrylic acid, citric acid, malic acid, agaric acid, fumaric acid, maleic acid, itaconic acid, citric acid and anhydrides thereof.

The poly(arylene ether) resin modified with unsaturated carboxylic acid or an anhydride thereof may, for example, be produced by graft-reacting a poly(arylene ether) resin with unsaturated carboxylic acid or an anhydride thereof in a melt, solution or slurry state.

In a specific example, the poly(arylene ether) resin modified with unsaturated carboxylic acid or an anhydride thereof may be produced by mixing a poly(arylene ether) resin with unsaturated carboxylic acid or an anhydride thereof, melt-kneading the mixture in a kneader at a temperature of 250 to 350° C. for 0.1 to 10 minutes and graft-reacting the resulting mixture.

The unsaturated carboxylic acid or an anhydride thereof may, for example, be present in an amount of 0.05 to 2% by weight, 0.1 to 1.5% by weight, or 0.2 to 1% by weight, with respect to the poly(arylene ether) resin used for graft reaction. Within this range, there are effects of superior dispersibility due to interfacial tension between poly(arylene ether) and polyamide, excellent mechanical strength and balance in physical properties.

The poly(arylene ether) resin modified with unsaturated carboxylic acid or an anhydride thereof is present at the interface between the domain resin and the matrix resin and, in this case, it functions to reduce interfacial tension between the poly(arylene ether) resin, which is the outermost layer of the domain resin, and the polyamide resin which is the matrix resin, and thereby improve dispersibility of the domain resin.

The poly(arylene ether) resin modified with unsaturated carboxylic acid or an anhydride thereof may, for example, have a glass transition temperature (Tg) of 160 to 220° C., 170 to 210° C., or 180 to 200° C. Within this range, there are effects of superior mechanical properties and balance in physical properties.

The phase of the domain resin dispersed in the matrix resin may, for example, have an average diameter of 0.01 to 3 μm, 0.1 to 2.5 μm, or 0.3 to 2 μm. Within this range, there are effects of superior impact strength, weatherability and balance in physical properties.

The average diameter of the dispersed phase means an average of particle diameters (the maximum length) based on a long axis of the domain resin as measured from a transmission electron microscope (TEM, magnification ×5.0 k) image.

The poly(arylene ether) resin modified with unsaturated carboxylic acid or an anhydride thereof may, for example, be present in an amount of 1 to 10% by weight, 1 to 8% by weight, or 3 to 8% by weight, with respect to the modified poly(arylene ether) resin composition according to the present invention. Within this range, there are effects of superior balance in physical properties and processability.

A total content of the poly(arylene ether) resin and the poly(arylene ether) resin modified with unsaturated carboxylic acid or an anhydride thereof is, for example, 20% by weight or more, 20 to 40% by weight or more, or 30 to 40% by weight, with respect to the modified poly(arylene ether) resin composition according to the present invention. Within this range, there are effects of superior impact strength and balance in physical properties.

The polyamide resin of the present invention is not particularly limited so long as it can be commonly blended with the poly(arylene ether) resin and examples thereof include: lactams such as ε-caprolactam or ω-laurolactam; or amino acids such as 6-aminocaproic acid, 11-aminoundecanoic acid, 12-aminododecanoic acid and paraaminomethyl benzoic acid; and products of condensed polymerization thereof.

Other examples of the polyamide resin include aliphatic, alicyclic or aromatic dicarboxylic acids such as malonic acid, dimethyl malonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, suberic acid, dodecanedioic acid, eicosadienoic acid, terephthalic acid, isophthalic acid, naphthalenedicarboxylic acid, 2-chloroterephthalic acid, 2-methyl terephthalic acid, 5-methyl isophthalic acid, 5-sodium sulfoisophthalic acid, hexahydrochloride acid and diglycolic acid; aliphatic, alicyclic or aromatic diamines such as tetramethylenediamine, hexamethylenediamine, 2-methylpentamethylenediamine, undecamethylenediamine, dodecamethylenediamine, 2,2,4-trimethylhexamethylenediamine, 2,4,4-trimethylhexamethylenediamine, 5-methylnonamethylenediamine, meta-xylenediamine, para-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine and aminoethylpiperazine; or salts thereof; or polymers of a combination thereof.

The polyamide resin may, for example, include one or more selected from the group consisting of nylon 6, nylon 11, nylon 12, nylon 66, nylon 116, nylon 610 and nylon 612.

The polyamide resin may, for example, have a relative viscosity of 2.0 to 3.2 dl/g, 2.0 to 3.0 dl/g, or 2.4 to 2.7 dl/g. Within this range, there are effects of superior compatibility and balance in physical properties.

The polyamide resin may, for example, be present in an amount of 30 to 70% by weight, 35 to 65% by weight, or 40 to 60% by weight, with respect to the modified poly(arylene ether) resin composition according to the present invention. Within this range, there are effects of superior dimensional stability by moisture absorption, impact strength and flowability.

The polyolefin resin of the present invention is, for example, a homopolymer of olefin or a copolymer of olefin and other vinyl monomers.

The polyolefin resin is, for example, a polyethylene polymer, a polypropylene polymer, or a copolymer of propylene and one or more olefins selected from the group consisting of ethylene, 1-butene, 1-pentene, 4-methyl-1-pentene, 1-hexene, 1-octene and 1-decene. In another example, the polyolefin resin includes one or more selected from the group consisting of a polypropylene polymer, a polypropylene copolymer, a propylene-alpha-olefin copolymer, a propylene-ethylene copolymer, a propylene-butene copolymer and a propylene-ethylene-butene copolymer. In particular, use of a polypropylene copolymer results in effects of superior impact strength and heat resistance.

The polyolefin resin may, for example, be present in an amount of 1 to 20% by weight, 5 to 20% by weight, or 5 to 15% by weight, with respect to the modified poly(arylene ether) resin composition according to the present invention. Within this range, there are effects of optimizing weatherability and impact balance of the resin composition and reducing specific gravity.

The polyolefin resin may, for example, have a melt index (MI, 230° C., 2.16 kg) of 0.2 to 100 g/10 min, 3 to 90 g/10 min, or 30 to 100 g/10 min. Within this range, there are effects of encapsulating the polyolefin resin in the modified poly(arylene ether) resin and securing superior weatherability and balance in physical properties.

The polyolefin resin can be prepared by an ordinary method and, in a specific example, can be prepared by copolymerization using bulk, slurry or gas polymerization of olefin with alpha-olefin in the presence of a suitable catalyst.

The encapsulating agent of the present invention is not particularly limited so long as it can be used for the poly(arylene ether) resin composition and is preferably a styrene-based block copolymer. In this case, there is an effect in that the polyolefin resin can be encapsulated with a modified poly(arylene ether) resin having low compatibility with the polyolefin resin.

The encapsulating agent may, for example, include one or more selected from the group consisting of a styrene-butadiene copolymer, a styrene-ethylene-propylene copolymer, a styrene-isoprene copolymer, an α-methylstyrene-butadiene copolymer, a styrene-butadiene-styrene copolymer, a styrene-ethylene-propylene-styrene copolymer, a styrene-ethylene-butylene-styrene copolymer, a styrene-(ethylene-butylene/styrene copolymer)-styrene copolymer, a styrene-isoprene-styrene copolymer, an α-methylstyrene-butadiene-α-methylstyrene copolymer and hydrogenated analogs thereof. In this case, there is an effect that the polyolefin resin can be encapsulated with a modified poly(arylene ether) resin having low compatibility with the polyolefin resin.

In a specific example, the styrene-ethylene-butylene-styrene copolymer or the hydrogenated styrene-ethylene-butylene-styrene copolymer has effects of superior impact strength and balance in physical properties.

The encapsulating agent may for example have a specific gravity of 0.8 to 0.99, 0.85 to 0.95, or 0.88 to 0.90. Within this range, there are effects of improving impact strength of the resin composition, while reducing specific gravity of the resin composition.

The encapsulating agent may for example have a shore A hardness of 30 to 70, 40 to 60, or 45 to 50. Within this range, there are effects of superior impact strength and balance in physical properties.

The encapsulating agent may, for example, be present in an amount of 1 to 20% by weight, 2 to 18% by weight, or 5 to 15% by weight, with respect to the modified poly (arylene ether) resin composition according to the present invention. Within this range, there are effects of superior impact strength and balance in physical properties.

The modified poly(arylene ether) resin composition may, for example, further include 0 to 5% by weight, 1 to 4% by weight, or 2 to 3% by weight of an inorganic filler. Within this range, there are effects of superior processability, dimensional stability and impact strength, and excellent balance in physical properties.

The inorganic filler may, for example, include one or more selected from the group consisting of talc, wollastonite, calcium carbonate, wood flour, chalk, glass flakes and glass fibers.

The modified poly(arylene ether) resin composition may, for example, further include 0.1 to 5% by weight, or 1 to 4% by weight, or 2 to 3% by weight of an additive.

The additive may, for example, include one or more selected from the group consisting of an antioxidant, a lubricant, a heat stabilizer, a flame retardant, an antistatic agent, a filler, a crosslinking agent and a coloring agent.

The modified poly(arylene ether) resin composition may, for example, have a specific gravity of 1.09 or less, 1.02 to 1.09, 1.04 to 1.08, or 1.05 to 1.08. Within this range, there are effects of superior heat resistance and processability.

The modified poly(arylene ether) resin composition may, for example, have an impact strength exceeding 10 kgf·cm/cm$^2$, 11 kgf·cm/cm$^2$ or higher, 15 to 30 kgf·cm/cm$^2$, or 15 to 25 kgf·cm/cm$^2$.

In addition, a method of preparing the modified poly (arylene ether) resin composition according to the present invention includes simultaneously batch-feeding a poly (arylene ether) resin, a poly(arylene ether) resin modified with unsaturated carboxylic acid or an anhydride thereof, a polyamide resin, a polyolefin resin and an encapsulating agent into a main feeder of a kneader.

When the poly(arylene ether) resin, the poly(arylene ether) resin modified with unsaturated carboxylic acid or an anhydride thereof, the polyamide resin, the polyolefin resin and the encapsulating agent are batch fed, there is an effect in that the domain resin is uniformly dispersed in the matrix resin and balance in physical properties is excellent.

The method of preparing the modified poly(arylene ether) resin composition may, for example, include melting and kneading at a temperature of 250 to 320° C., or 260 to 300° C.

The kneader may, for example, be a Banbury mixer, a single screw extruder, a twin screw extruder, a BUSS kneader or the like.

In addition, the molded article according to the present invention is produced from the modified poly(arylene ether) resin composition.

Although preferred examples of the present invention will be provided for better understanding of the present invention, these examples are provided only for illustration of the present invention. Those skilled in the art will appreciate that various modifications, additions and substitutions are possible, without departing from the scope and spirit of the invention as disclosed in the accompanying claims. Obviously, such modifications, additions and substitutions fall under the scope of the claims.

EXAMPLE

Example 1

35% by weight of poly(2,6-dimethyl-phenyl) ether, 5% by weight of maleic anhydride modified poly(phenylene ether) having a glass transition temperature of 190° C., 45% by weight of nylon 66 having a relative viscosity of 2.4 dl/g, 10% by weight of polypropylene having a melt index (230° C., 2.16 kg) of 90 g/10 min, 4% by weight of a styrene-ethylene-butylene-styrene copolymer having a specific gravity of 0.89 and a shore A hardness of 47 and 1% by weight of an additive were mixed in a mixer and were batch-fed into a main feeder of a twin screw extruder (L/D=45, Φ=40). Then, these substances were melted, kneaded and extruded at a temperature of 270 to 290° C. and at 250 to 350 rpm to produce a pellet-type resin composition. Subsequently, the pellet-type resin composition chip was dried at 110° C. for 6 hours and samples for evaluating physical properties were produced using a screw-type injector heated to 260 to 300° C. and a die temperature of 80 to 130° C.

Figure 1:
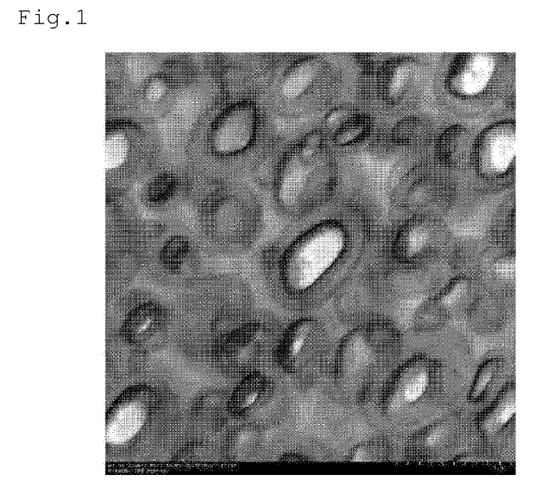
FIG. 1 is a transmission electron microscope image (TEM, magnification ×5.0 k) showing a state in which a modified poly(arylene ether) resin composition according to Example 1 is dispersed.

Physical properties of the produced samples were measured by the following measurement, results are shown in the following Table 1, and a transmission electron microscope image is shown in FIG. 1.

Examples 2 and 3

The same process as in Example 1 was conducted, except that the ingredients were fed in contents (% by weight) set forth in the following Table 1.

Comparative Example 1

The same process as in Example 1 was conducted, except that poly(2,6-dimethyl-phenyl) ether was not fed and maleic anhydride modified poly(phenylene ether) was fed in an amount of 40% by weight.

Figure 2:
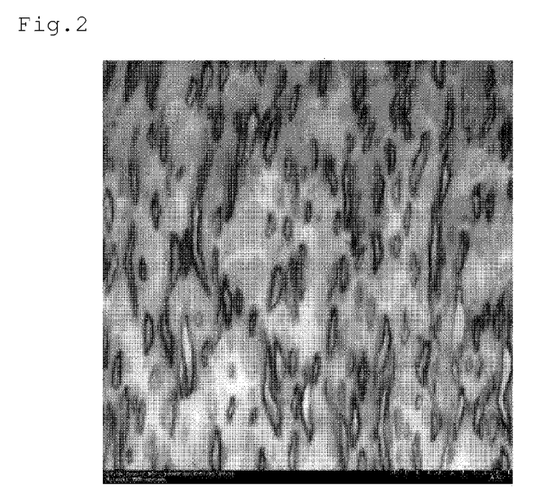
FIG. 2 is a transmission electron microscope image (TEM, magnification ×5.0 k) showing a state in which a modified poly(arylene ether) resin composition according to Comparative Example 1 is dispersed.

The transmission electron microscope image of the produced sample is shown in FIG. 2.

Comparative Example 2

The same process as in Example 1 was conducted, except that poly(2,6-dimethyl-phenyl) ether was fed in an amount of 40% by weight, 0.2% by weight of citric acid was fed, instead of the maleic anhydride, and 0.8% by weight of an additive was fed.

Comparative Example 3

The same process as in Example 1 was conducted, except that poly(2,6-dimethyl-phenyl) ether was fed in an amount of 15% by weight, maleic anhydride modified poly(phenylene ether) was fed in an amount of 5% by weight, and nylon 66 was fed in an amount of 65% by weight.

Comparative Example 4

The same process as in Example 1 was conducted, except that the styrene-ethylene-butylene-styrene copolymer was not fed and nylon 66 was fed in an amount of 49% by weight.

Figure 3:
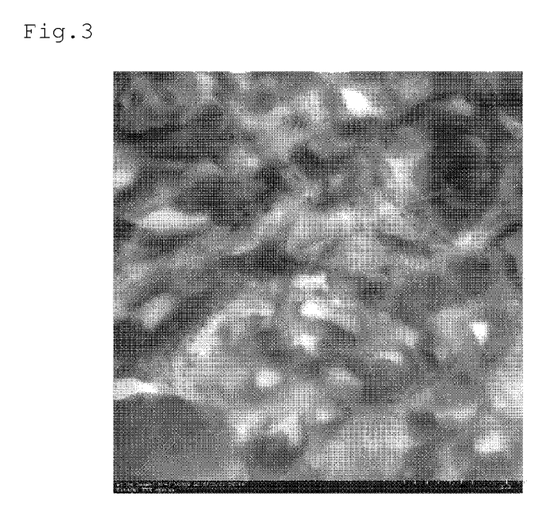
FIG. 3 is a transmission electron microscope image (TEM, magnification ×5.0 k) showing a state in which a modified poly(arylene ether) resin composition according to Comparative Example 4 is dispersed.

The transmission electron microscope image of the produced sample is shown in FIG. 3.

Comparative Example 5

The same process as in Example 1 was conducted, except that maleic anhydride modified poly(ethylene-co-octene) rubber(poly(ethylene-co-octene) rubber-maleic anhydride, EOR-MAH) was fed, instead of the styrene-ethylene-butylene-styrene copolymer.

Figure 4:
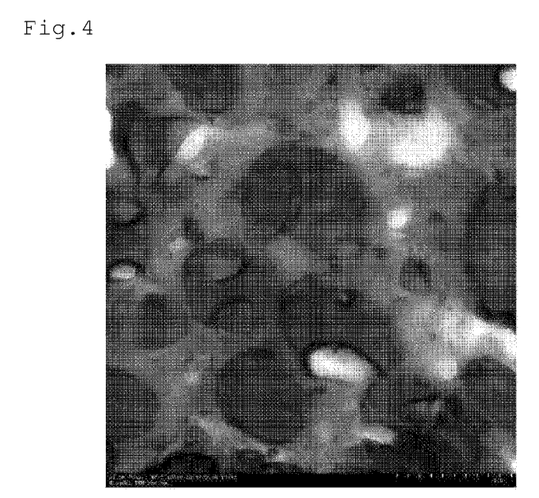
FIG. 4 is a transmission electron microscope image (TEM, magnification ×5.0 k) showing a state in which a modified poly(arylene ether) resin composition according to Comparative Example 5 is dispersed.

The transmission electron microscope image of the produced sample is shown in FIG. 4.

Comparative Example 6

The same process as in Example 1 was conducted, except that poly(2,6-dimethyl-phenyl) ether was not fed, maleic anhydride modified poly(phenylene ether) was fed in an amount of 30% by weight, nylon 66 was fed in an amount of 55% by weight, polypropylene was fed in an amount of 10% by weight and maleic anhydride modified poly(ethylene-co-octene) rubber(poly(ethylene-co-octene) rubber-maleic anhydride, EOR-MAH) was fed, instead of styrene-ethylene-butylene-styrene copolymer.

Comparative Example 7

The same process as in Example 1 was conducted, except that maleic anhydride modified poly(phenylene ether) was not fed, poly(2,6-dimethyl-phenyl) ether was fed in an amount of 50% by weight, nylon 66 was fed in an amount of 28% by weight, polypropylene was fed in an amount of 15% by weight, and maleic anhydride modified poly(ethylene-co-octene) rubber(poly(ethylene-co-octene) rubber-maleic anhydride, EOR-MAH) was fed in an amount of 6% by weight, instead of the styrene-ethylene-butylene-styrene copolymer.

Test Example

Physical properties of modified poly(arylene ether) resin compositions obtained in Examples 1 to 3 and Comparative Examples 1 to 7 were measured by the following measurement method and results are shown in the following Table 1.

Measurement Method

Melt index (g/10 min): measured using a sample in accordance with standard test method ASTM D1238 (230° C., 2.16 kg).

Relative viscosity (dl/g): measured using a solution of the sample in 96% sulfuric acid with an Ubbelohde viscometer.

Specific gravity (dl/g): measured using a specific gravity meter in accordance with ASTM D792.

Impact strength (Notched Izod, kgf·cm/cm$^2$): using a ¼" sample in accordance with standard test method, ASTM D256.

Weatherability: the sample was aged by exposing in accordance with standard test method ASTM G155 for 250 hours at 0.35 W/m$^2$, Outer & Inner filter: Boro+Boro, 2 cycles (light emission for 102 minutes and, then light emission and spray for 18 minutes), whether or not the surface of the sample was whitened was evaluated by the naked eye, and a case in which whitening did not occur and a case in which whitening occurred are represented by ○ and X in the following Table 1.

TABLE 1

|  | Examples | | | Comparative Examples | | | | | | |
|---|---|---|---|---|---|---|---|---|---|---|
| Items | 1 | 2 | 3 | 1 | 2 | 3 | 4 | 5 | 6 | 7 |
| PPE | 35 | 35 | 33 | — | 40 | 15 | 35 | 35 | — | 50 |
| PPE-MAH | 5 | 5 | 7 | 40 | — | 5 | 5 | 5 | 30 | — |
| CA | — | — | — | — | 0.2 | — | — | — | — | — |

TABLE 1-continued

|  | Examples | | | Comparative Examples | | | | | | |
|---|---|---|---|---|---|---|---|---|---|---|
| Items | 1 | 2 | 3 | 1 | 2 | 3 | 4 | 5 | 6 | 7 |
| PA | 45 | 45 | 38 | 45 | 45 | 65 | 49 | 45 | 55 | 28 |
| PP | 10 | 5 | 15 | 10 | 10 | 10 | 10 | 10 | 10 | 15 |
| SEBS | 4 | 4 | 6 | 4 | 4 | 4 | — | — | — | — |
| EOR-MAH | — | — | — | — | — | — | — | 4 | 4 | 6 |
| Additive | 1 | 1 | 1 | 1 | 0.8 | 1 | 1 | 1 | 1 | 1 |
| Specific gravity | 1.06 | 1.07 | 1.05 | 1.06 | 1.06 | 1.04 | 1.06 | 1.06 | 1.07 | 1.04 |
| Impact strength | 20 | 20 | 19 | 10 | 6 | 6 | 7 | 7 | 10 | 6 |
| Weather ability | ○ | ○ | ○ | ○ | ○ | X | X | X | X | X |

\* PPE: Poly(2,6-dimethyl-phenyl) ether
\* PPE-MAH: Maleic anhydride modified poly(phenylene ether)
\* CA: Citric acid
\* PA: Nylon 66
\* PP: Polypropylene
\* SEBS: Styrene-ethylene-butylene-styrene copolymer
\* EOR-MAH: Maleic anhydride modified poly(ethylene-co-octene) rubber
\* Additive As can be seen from Table 1, all of Examples 1 to 3 produced according to the present invention satisfied both low specific gravity and weatherability, and exhibited high impact strength, which means that Examples 1 to 3 had excellent balance in physical properties.

In addition, as shown in the transmission electron microscope image of FIG. 1, in the case of Example 1 according to the present invention, a domain resin including a polypropylene resin encapsulated with a poly(phenylene ether) resin is uniformly dispersed in a matrix resin including a polyamide resin.

On the other hand, Comparative Example 1 in which the poly(arylene ether) resin was not fed and only a poly(arylene ether) resin modified with unsaturated carboxylic acid or an anhydride thereof was fed exhibited considerably low impact strength. In addition, as can be seen from the transmission electron microscope image of FIG. 2, the polypropylene resin was entirely encapsulated because the phase of the poly(arylene ether) resin modified with unsaturated carboxylic acid or an anhydride thereof in the matrix resin was greatly decreased.

It can be seen that Comparative Example 2 in which poly(arylene ether) resin modified with unsaturated carboxylic acid or an anhydride thereof was not fed, only the poly(arylene ether) resin was fed and citric acid was fed as a compatibilizing agent had considerably deteriorated impact strength, and Comparative Example 3 in which the total content of the poly(arylene ether) resin and poly(arylene ether) resin modified with unsaturated carboxylic acid or an anhydride thereof was not within the appropriate range, had considerably deteriorated impact strength and weatherability.

In addition, it can be seen that Comparative Example 4 in which an encapsulating agent was not fed had considerably deteriorated impact strength and weatherability, and it can be seen from the transmission electron microscope image of FIG. 3 that the poly(arylene ether) resin and the polypropylene resin were not encapsulated and were separately dispersed, which means that the domain resin was not formed.

In addition, it can be seen that Comparative Example 5 in which an encapsulating agent was not fed and a maleic anhydride modified poly(ethylene-co-octene) rubber was fed exhibited considerably deteriorated impact strength and weatherability and it can be seen from the transmission electron microscope image of FIG. 4 that the poly(arylene ether) resin and the polypropylene resin were not encapsulated and were separately dispersed, which means that the domain resin was not formed.

In addition, it can be seen that Comparative Example 6 in which the poly(arylene ether) resin was not fed, only the poly(arylene ether) resin modified with unsaturated carboxylic acid or an anhydride thereof was fed, an encapsulating agent was not fed, and a maleic anhydride modified poly(ethylene-co-octene) rubber was fed exhibited poor impact strength and weatherability, whereas Comparative Example 7 in which the poly(arylene ether) resin modified with unsaturated carboxylic acid or an anhydride thereof was not fed, only the poly(arylene ether) resin was fed, an encapsulating agent was not fed, and a maleic anhydride modified poly(ethylene-co-octene) rubber was fed had extremely poor impact strength and weatherability.

Consequently, it can be seen that specific gravity of the modified poly(arylene ether) resin composition according to the present invention is reduced and change in physical properties caused by moisture thereof is minimized by mixing a poly(arylene ether)/polyamide blending resin with an unsaturated carboxylic acid or an anhydride thereof modified poly(arylene ether) resin, a polyolefin resin and an encapsulating agent and encapsulating the polyolefin resin with the poly(arylene ether) resin. Based on the present invention, it can be seen that it is possible to realize a modified poly(arylene ether) resin composition which has less change in physical properties caused by moisture, and has low specific gravity and superior impact strength, weatherability and balance in physical properties and a molded article produced therefrom.

What is claimed is:

1. A modified poly(arylene ether) resin composition comprising:
   a poly(arylene ether) resin in an amount of 10-40% by weight;
   1 to 10% by weight, with respect to the modified poly(arylene ether) resin composition, of a poly(arylene ether) resin modified with unsaturated carboxylic acid or an anhydride thereof;
   a polyamide resin;
   a polyolefin resin; and
   an encapsulating agent,
   wherein the modified poly(arylene ether) resin composition has a morphology comprising:

a) a domain resin comprising a core, the core comprising the polyolefin resin, a capsule surrounding the core, the capsule comprising the poly(arylene ether) resin and the poly(arylene ether) resin modified with unsaturated carboxylic acid or an anhydride thereof, and a membrane formed by the encapsulating agent between the core and the capsule; and b) a matrix resin comprising the polyamide resin and wherein the composition has a notched Izod impact strength exceeding 11 kgf·cm/cm2.

2. The modified poly(arylene ether) resin composition according to claim 1, wherein the poly(arylene ether) resin is a homopolymer having a unit represented by the following Formula 1 or Formula 2, or a copolymer having a unit represented by the following Formula 1 or Formula 2:

wherein $R_a$, $R_1$, $R_2$, $R_3$ and $R_4$ are substituents of an arylene group (Ar) or a phenylene group, which are each independently or simultaneously a hydrogen, chlorine, bromine, iodine, methyl, ethyl, propyl, allyl, phenyl, methylbenzyl, chloromethyl, bromomethyl, cyanoethyl, cyano, methoxy, phenoxy or nitro group, n an integer of 4 to 20, and Ar is a C7-C20 arylene group.

3. The modified poly(arylene ether) resin composition according to claim 1, wherein the poly(arylene ether) resin has a weight average molecular weight of 10,000 to 100,000 g/mol.

4. The modified poly(arylene ether) resin composition according to claim 1, wherein a total content of the poly(arylene ether) resin, and the poly(arylene ether) resin modified with unsaturated carboxylic acid or an anhydride thereof is present in an amount of 20% by weight or higher, with respect to the modified poly(arylene ether) resin composition.

5. The modified poly(arylene ether) resin composition according to claim 1, wherein the polyamide resin is present in an amount of 30 to 70% by weight, with respect to the modified poly(arylene ether) resin composition.

6. The modified poly(arylene ether) resin composition according to claim 1, wherein the polyolefin resin is a homopolymer of olefin or a copolymer of olefin and other vinyl monomers.

7. The modified poly(arylene ether) resin composition according to claim 1, wherein the polyolefin resin is present in an amount of 1 to 20% by weight, with respect to the modified poly(arylene ether) resin composition.

8. The modified poly(arylene ether) resin composition according to claim 1, wherein the encapsulating agent is a styrene-based block copolymer.

9. The modified poly(arylene ether) resin composition according to claim 1, wherein the encapsulating agent comprises one or more selected from the group consisting of a styrene-butadiene copolymer, a styrene-ethylene-propylene copolymer, a styrene-isoprene copolymer, an α-methylstyrene-butadiene copolymer, a styrene-butadiene-styrene copolymer, a styrene-ethylene-propylene-styrene copolymer, a styrene-ethylene-butylene-styrene copolymer, a styrene-(ethylene-butylene/styrene copolymer)-styrene copolymer, a styrene-isoprene-styrene copolymer, an α-methylstyrene-butadiene-α-methylstyrene copolymer and hydrogenated analogs thereof.

10. The modified poly(arylene ether) resin composition according to claim 1, wherein the encapsulating agent is present in an amount of 1 to 20% by weight, with respect to the modified poly(arylene ether) resin composition.

11. A modified poly(arylene ether) resin composition comprising:
a poly(arylene ether) resin;
a poly(arylene ether) resin modified with unsaturated carboxylic acid or an anhydride thereof;
a polyamide resin;
a polyolefin resin; and
an encapsulating agent,
wherein the modified poly(arylene ether) resin composition has a morphology comprising:
a) a domain resin comprising a core, the core comprising the polyolefin resin, a capsule surrounding the core, the capsule comprising the poly(arylene ether) resin and the poly(arylene ether) resin modified with unsaturated carboxylic acid or an anhydride thereof, and a membrane formed by the encapsulating agent between the core and the capsule; and
b) a matrix resin comprising the polyamide resin,
wherein the modified poly(arylene ether) resin composition further comprises 0.1 to 5% by weight of an inorganic filler and wherein the composition has a notched Izod impact strength exceeding 11 kgf·cm/cm2.

12. The modified poly(arylene ether) resin composition according to claim 11, wherein the inorganic filler comprises one or more selected from the group consisting of talc, wollastonite, calcium carbonate, wood flour, chalk, glass flakes and glass fibers.

13. The modified poly(arylene ether) resin composition according to claim 1, wherein the modified poly(arylene ether) resin composition has a specific gravity of 1.09 or less.

14. The modified poly(arylene ether) resin composition according to claim 1, wherein the modified poly(arylene ether) resin composition has an impact strength exceeding 15 kgf·cm/cm$^2$, measured in accordance with ASTM D256.

15. A molded article produced from the modified poly(arylene ether) resin composition according to claim 1.

16. The modified poly(arylene ether) resin composition according to claim 1, comprising:
10 to 40% by weight of the poly(arylene ether) resin, with respect to the modified poly(arylene ether) resin composition;
1 to 10% by weight of the poly(arylene ether) resin modified with unsaturated carboxylic acid or an anhydride thereof, with respect to the modified poly(arylene ether) resin composition;
30 to 70% by weight of the polyamide resin, with respect to the modified poly(arylene ether) resin composition;
1 to 20% by weight of the polyolefin resin, with respect to the modified poly(arylene ether) resin composition; and
1 to 20% by weight of the encapsulating agent, with respect to the modified poly(arylene ether) resin composition.

17. The modified poly(arylene ether) resin composition according to claim 1, wherein the poly(arylene ether) resin modified with unsaturated carboxylic acid or an anhydride thereof comprises 0.05 to 2% by weight unsaturated carboxylic acid or an anhydride thereof, with respect to the poly(arylene ether) resin.

18. The modified poly(arylene ether) resin composition according to claim 1, wherein a total content of the poly(arylene ether) resin, and the poly(arylene ether) resin modified with unsaturated carboxylic acid or an anhydride thereof, is present in an amount of 20 to 40% by weight, with respect to the modified poly(arylene ether) resin composition.

* * * * *